(12) United States Patent
Stewart et al.

(10) Patent No.: US 7,275,374 B2
(45) Date of Patent: Oct. 2, 2007

(54) COORDINATED MULTIVARIABLE CONTROL OF FUEL AND AIR IN ENGINES

(75) Inventors: Gregory E. Stewart, Vancouver (CA); Syed M. Shahed, Rancho Palos Verdes, CA (US); Francesco Borrelli, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/094,350

(22) Filed: Mar. 30, 2005

(65) Prior Publication Data
US 2006/0137347 A1    Jun. 29, 2006

Related U.S. Application Data

(63) Continuation-in-part of application No. 11/024,531, filed on Dec. 29, 2004, and a continuation-in-part of application No. 11/025,221, filed on Dec. 29, 2004, and a continuation-in-part of application No. 11/025,563, filed on Dec. 29, 2004, now Pat. No. 7,165,399.

(51) Int. Cl.
*F02D 23/00* (2006.01)
*F02M 25/07* (2006.01)
*F02M 7/00* (2006.01)
*F01N 3/00* (2006.01)
*G05B 13/04* (2006.01)
*G05D 1/00* (2006.01)
*G06F 7/00* (2006.01)
*G06F 17/00* (2006.01)

(52) U.S. Cl. .................... 60/601; 60/602; 60/605.2; 60/285; 60/286; 60/295; 477/905; 701/108; 701/111; 123/299; 123/435

(58) Field of Classification Search .......... 60/600–603, 60/280–295, 773, 605.2; 123/299, 456, 684, 123/352, 478, 492, 399, 357, 435; 477/905; 701/111, 108; 290/40 A; 700/45
See application file for complete search history.

(56) References Cited

U.S. PATENT DOCUMENTS
3,744,461 A    7/1973    Davis
(Continued)

FOREIGN PATENT DOCUMENTS
DE    19607071    8/1997
(Continued)

OTHER PUBLICATIONS

Alberto Bemporad et al., "On Hybrid Systems and Closed-Loop MPC Systems", IEEE Transaction On Automotive Control, vol. 47, No. 5, May 2002.*

(Continued)

*Primary Examiner*—Thai-Ba Trieu
(74) *Attorney, Agent, or Firm*—Kris T. Fredrick

(57) ABSTRACT

Methods and systems for controlling a diesel engine using a combined fuel and air-side controller are disclosed. An illustrative method may include the steps of providing a combined fuel and air-side controller adapted to coordinate both the fuel and air-side control of an engine, sensing one or more parameters, and outputting a fuel profile signal and one or more air-side control signals for controlling at least a part of the fuel-side and at least a part of the air-side of the engine. By centrally coordinating both the fuel and air-side control of the engine, the system can be configured to anticipate future fuel and/or air-side needs of the engine, thus improving system response, performance, and/or emissions.

34 Claims, 7 Drawing Sheets

U.S. PATENT DOCUMENTS

| | | | |
|---|---|---|---|
| 4,005,578 A | 2/1977 | McInerney | |
| 4,055,158 A | 10/1977 | Marsee | |
| 4,252,098 A | 2/1981 | Tomczak et al. | |
| 4,383,441 A | 5/1983 | Willis et al. | |
| 4,426,982 A | 1/1984 | Lehner et al. | |
| 4,438,497 A | 3/1984 | Willis et al. | |
| 4,456,883 A | 6/1984 | Bullis et al. | |
| 4,485,794 A | 12/1984 | Kimberley et al. | |
| 4,589,302 A * | 5/1986 | Oda et al. | 477/905 |
| 4,601,270 A | 7/1986 | Kimberley et al. | |
| 4,653,449 A | 3/1987 | Kamei et al. | |
| 5,044,337 A | 9/1991 | Williams | |
| 5,048,495 A * | 9/1991 | Onari et al. | 123/492 |
| 5,076,237 A | 12/1991 | Hartman et al. | |
| 5,089,236 A | 2/1992 | Clerc | |
| 5,108,716 A | 4/1992 | Nishizawa | |
| 5,123,397 A | 6/1992 | Richeson | |
| 5,233,829 A | 8/1993 | Komatsu | |
| 5,261,378 A * | 11/1993 | Fenchel et al. | 123/357 |
| 5,272,621 A * | 12/1993 | Aoki | 700/45 |
| 5,282,449 A | 2/1994 | Takahashi et al. | |
| 5,349,816 A | 9/1994 | Sanbayashi et al. | |
| 5,349,932 A * | 9/1994 | Boverie et al. | 123/399 |
| 5,365,734 A | 11/1994 | Takeshima | |
| 5,398,502 A | 3/1995 | Watanabe | |
| 5,452,576 A | 9/1995 | Hamburg et al. | |
| 5,477,840 A | 12/1995 | Neumann | |
| 5,560,208 A | 10/1996 | Halimi et al. | |
| 5,570,574 A | 11/1996 | Yamashita et al. | |
| 5,609,136 A * | 3/1997 | Tuken | 123/357 |
| 5,609,139 A | 3/1997 | Ueda et al. | |
| 5,611,198 A | 3/1997 | Lane et al. | |
| 5,690,086 A | 11/1997 | Kawano et al. | |
| 5,692,478 A | 12/1997 | Nogi et al. | |
| 5,746,183 A | 5/1998 | Parke et al. | |
| 5,765,533 A | 6/1998 | Nakajima | |
| 5,771,867 A | 6/1998 | Amstutz et al. | |
| 5,785,030 A | 7/1998 | Paas | |
| 5,788,004 A | 8/1998 | Friedmann et al. | |
| 5,806,496 A * | 9/1998 | Saito | 123/478 |
| 5,846,157 A | 12/1998 | Reinke et al. | |
| 5,893,092 A | 4/1999 | Driscoll | |
| 5,942,195 A | 8/1999 | Lecea et al. | |
| 5,964,199 A | 10/1999 | Atago et al. | |
| 5,974,788 A | 11/1999 | Hepburn et al. | |
| 6,029,626 A | 2/2000 | Bruestle | |
| 6,035,640 A | 3/2000 | Kolmanovsky et al. | 60/605.2 |
| 6,048,620 A | 4/2000 | Zhong | |
| 6,055,810 A * | 5/2000 | Borland et al. | 60/600 |
| 6,058,700 A | 5/2000 | Yamashita et al. | |
| 6,067,800 A | 5/2000 | Kolmanovsky et al. | 60/602 |
| 6,076,353 A | 6/2000 | Freudenberg et al. | 701/108 |
| 6,105,365 A | 8/2000 | Deeba et al. | |
| 6,153,159 A | 11/2000 | Engeler et al. | |
| 6,161,528 A | 12/2000 | Akao et al. | |
| 6,170,259 B1 | 1/2001 | Boegner et al. | |
| 6,171,556 B1 | 1/2001 | Burk et al. | |
| 6,178,743 B1 | 1/2001 | Hirota et al. | 60/286 |
| 6,178,749 B1 | 1/2001 | Kolmanovsky et al. | 60/600 |
| 6,216,083 B1 | 4/2001 | Ulyanov et al. | |
| 6,237,330 B1 | 5/2001 | Takahashi et al. | |
| 6,242,873 B1 | 6/2001 | Drozdz et al. | |
| 6,263,672 B1 | 7/2001 | Roby et al. | |
| 6,273,060 B1 | 8/2001 | Cullen | |
| 6,279,551 B1 | 8/2001 | Iwano et al. | 123/564 |
| 6,305,167 B1 | 10/2001 | Weisman et al. | 60/602 |
| 6,312,538 B1 | 11/2001 | Latypov et al. | |
| 6,321,538 B2 | 11/2001 | Hasler | 60/612 |
| 6,338,245 B1 * | 1/2002 | Shimoda et al. | 60/285 |
| 6,347,619 B1 | 2/2002 | Whiting et al. | |
| 6,360,159 B1 | 3/2002 | Miller et al. | |
| 6,360,541 B2 | 3/2002 | Waszkiewicz et al. | |
| 6,360,732 B1 | 3/2002 | Bailey et al. | |
| 6,379,281 B1 | 4/2002 | Collins et al. | |
| 6,425,371 B2 | 7/2002 | Majima | |
| 6,427,436 B1 | 8/2002 | Allansson et al. | |
| 6,431,160 B1 | 8/2002 | Sugiyama et al. | |
| 6,463,733 B1 | 10/2002 | Asik et al. | |
| 6,463,734 B1 | 10/2002 | Tamura et al. | |
| 6,467,452 B1 * | 10/2002 | Duffy et al. | 123/299 |
| 6,470,513 B1 | 10/2002 | Cook | |
| 6,470,682 B2 | 10/2002 | Gray, Jr. | 60/605.2 |
| 6,502,391 B1 | 1/2003 | Hirota et al. | |
| 6,512,974 B2 | 1/2003 | Houston et al. | |
| 6,546,329 B2 | 4/2003 | Bellinger | |
| 6,560,528 B1 | 5/2003 | Gitlin et al. | 701/115 |
| 6,571,191 B1 | 5/2003 | York et al. | |
| 6,579,206 B2 | 6/2003 | Liu et al. | |
| 6,612,293 B2 | 9/2003 | Schweinzer et al. | |
| 6,625,978 B1 | 9/2003 | Eriksson et al. | 60/295 |
| 6,629,408 B1 | 10/2003 | Murakami et al. | |
| 6,647,710 B2 | 11/2003 | Nishiyama et al. | 60/295 |
| 6,647,971 B2 | 11/2003 | Vaughan et al. | |
| 6,666,020 B2 * | 12/2003 | Tonetti et al. | 60/285 |
| 6,671,603 B2 | 12/2003 | Cari et al. | |
| 6,672,060 B1 | 1/2004 | Buckland et al. | 60/602 |
| 6,679,050 B1 | 1/2004 | Takahashi et al. | |
| 6,687,597 B2 | 2/2004 | Sulatisky et al. | |
| 6,688,166 B2 * | 2/2004 | Gerhard et al. | 701/101 |
| 6,705,084 B2 | 3/2004 | Allen et al. | 60/608 |
| 6,712,045 B1 * | 3/2004 | McCarthy, Jr. | 123/456 |
| 6,722,121 B2 * | 4/2004 | Gui et al. | 60/285 |
| 6,742,330 B2 | 6/2004 | Genderen | 60/286 |
| 6,758,037 B2 | 7/2004 | Terada et al. | |
| 6,789,533 B1 | 9/2004 | Hashimoto et al. | |
| 6,823,667 B2 | 11/2004 | Braun et al. | |
| 6,823,675 B2 * | 11/2004 | Brunell et al. | 60/773 |
| 6,826,903 B2 | 12/2004 | Yahata et al. | |
| 6,827,061 B2 | 12/2004 | Nytomt et al. | |
| 6,840,237 B2 * | 1/2005 | Strom et al. | 123/684 |
| 6,876,097 B2 * | 4/2005 | Thomas et al. | 290/40 A |
| 6,947,830 B1 * | 9/2005 | Froloff et al. | 701/111 |
| 6,953,024 B2 * | 10/2005 | Linna et al. | 123/435 |
| 7,047,938 B2 * | 5/2006 | Flynn et al. | 123/357 |
| 2001/0002591 A1 | 6/2001 | Majima | |
| 2002/0029564 A1 | 3/2002 | Roth et al. | |
| 2002/0056434 A1 | 5/2002 | Flamig-Vetter et al. | |
| 2002/0098975 A1 | 7/2002 | Kimura et al. | |
| 2002/0170550 A1 | 11/2002 | Mitsutani | |
| 2002/0173919 A1 | 11/2002 | Moteki et al. | |
| 2002/0184879 A1 | 12/2002 | Lewis | |
| 2002/0194835 A1 | 12/2002 | Bromberg et al. | |
| 2003/0022752 A1 | 1/2003 | Liu et al. | |
| 2003/0041590 A1 | 3/2003 | Kitajima et al. | |
| 2003/0089101 A1 | 5/2003 | Tanaka et al. | |
| 2003/0101713 A1 | 6/2003 | Dalla Betta et al. | |
| 2003/0120410 A1 | 6/2003 | Cari et al. | |
| 2003/0143957 A1 | 7/2003 | Lyon | |
| 2003/0145837 A1 | 8/2003 | Esteghlal et al. | |
| 2003/0150422 A1 | 8/2003 | Huh | |
| 2003/0172907 A1 | 9/2003 | Nytomt et al. | |
| 2003/0200016 A1 | 10/2003 | Spillane et al. | |
| 2003/0221679 A1 | 12/2003 | Surnilla | 123/674 |
| 2003/0225507 A1 | 12/2003 | Tamura | |
| 2004/0006973 A1 | 1/2004 | Makki et al. | |
| 2004/0007211 A1 | 1/2004 | Kobayashi | |
| 2004/0007217 A1 | 1/2004 | Poola et al. | |
| 2004/0025837 A1 | 2/2004 | Hunt et al. | |
| 2004/0034460 A1 | 2/2004 | Folkerts et al. | |
| 2004/0040283 A1 | 3/2004 | Yasui et al. | |
| 2004/0040287 A1 | 3/2004 | Beutel et al. | |
| 2004/0050037 A1 | 3/2004 | Betta et al. | |
| 2004/0055278 A1 | 3/2004 | Miyoshi et al. | |
| 2004/0060284 A1 | 4/2004 | Roberts, Jr. et al. | |

| | | |
|---|---|---|
| 2004/0074226 A1 | 4/2004 | Tanaka |
| 2004/0089279 A1 | 5/2004 | McLaughlin et al. |
| 2004/0118117 A1 | 6/2004 | Hartman et al. ............... 60/602 |
| 2004/0128058 A1 | 7/2004 | Andres et al. |
| 2004/0128985 A1* | 7/2004 | Shimasaki et al. ............ 60/285 |
| 2004/0129259 A1 | 7/2004 | Mitsutani |
| 2004/0134464 A1 | 7/2004 | Mogi .......................... 123/564 |
| 2004/0135584 A1 | 7/2004 | Nagy et al. |
| 2004/0139735 A1 | 7/2004 | Zhu |
| 2004/0139951 A1 | 7/2004 | Fisher et al. ................. 123/527 |
| 2004/0249558 A1 | 12/2004 | Meaney |
| 2006/0042590 A1* | 3/2006 | Uplap et al. ................. 123/352 |

FOREIGN PATENT DOCUMENTS

| | | |
|---|---|---|
| DE | 102004019658 | 12/2004 |
| EP | 0239095 | 9/1987 |
| EP | 0892166 | 1/1999 |
| EP | 1024261 | 8/2000 |
| EP | 1024263 | 8/2000 |
| EP | 1024272 | 8/2000 |
| JP | 60216018 | 10/1985 |
| JP | 07049049 | 2/1995 |
| WO | WO 02/101208 | 12/2002 |
| WO | WO 03065135 A1 * | 8/2003 |
| WO | WO 2004/027230 | 4/2004 |

OTHER PUBLICATIONS

"SCR, 400-csi Coated Catalyst," Leading NOx Control Technologies Status Summary, 1 page prior to the filing date of the present application.

Advanced Petroleum-Based Fuels-Diesel Emissions Control (APBF-DEC) Project, "Quarterly Update," No. 7, 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Bemporad, et al., "Explicit Model Predictive Control," 1 page, prior to filing date of present appplication.

Borrelli, "Constrained Optimal Control of Linear and Hybrid Systems," Lecture Notes in Control and Information Sciences, vol. 290, 2003.

Catalytica Energy Systems, "Innovative NOx Reduction Solutions for Diesel Engines," 13 pages, 3rd Quarter, 2003.

Chatterjee, et al. "Catalytic Emission Control for Heavy Duty Diesel Engines," JM, 46 pages, prior to filing date of present application.

Delphi, Delphi Diesel NOx Trap (DNT), 3 pages, Feb. 2004.

GM "Advanced Diesel Technology and Emissions," powertrain technologies—engines, 2 pages, prior to filing date of present application.

Guzzella, et al., "Control of Diesel Enginese," IEEE Control Systems Magazine, pp. 53-71, Oct. 1998.

Havelena, "Componentized Architecture for Advanced Process Management," Honeywell International, 42 pages, 2004.

Hiranuma, et al., "Development of DPF System for Commercial Vehicle—Basic Characteristic and Active Regeneration Performance," SAE Paper No. 2003-01-3182, Mar. 2003.

Honeywell, "Profit Optimizer A Distributed Quadratic Program (DQP) Concepts Reference," 48 pages, prior to filing date of present application.

http://www.not2fast.wryday.com/turbo/glossary/turbo_glossary.shtml, "Not2Fast: Turbo Glossary," 22 pages, printed Oct. 1, 2004.

http://www.tai-cwv.com/sb1106.0.html, "Technical Overview-Advanced Control Solutions," 6 pages, printed Sep. 9, 2004.

Kelly, et al., "Reducing Soot Emissions from Diesel Engines Using One Atmosphere Uniform Glow Discharge Plasma," SAE Paper No. 2003-01-1183, Mar. 2003.

Kolmanovsky, et al., "Issues in Modeling and Control of Intake Flow in Variable Geometry Turbocharged Engines", 18th IFIP Conf. System Modeling and Optimization, pp. 436-445, Jul. 1997.

Kulhavy, et al. "Emerging Technologies for Enterprise Optimization in the Process Industries," Honeywell, 12 pages, Dec. 2000.

Locker, et al., "Diesel Particulate Filter Operational Characterization," Corning Incorporated, 10 pages, prior to filing date of present application.

Lu "Challenging Control Problems and Engineering Technologies in Enterprise Optimization," Honeywell Hi-Spec Solutions, 30 pages, Jun. 4-6, 2001.

Moore, "Living with Cooled-EGR Engines," Prevention Illustrated, 3 pages, Oct. 3, 2004.

National Renewable Energy Laboratory (NREL), "Diesel Emissions Control- Sulfur Effects Project (DECSE) Summary of Reports," U.S. Department of Energy, 19 pages, Feb. 2002.

Salvat, et al., "Passenger Car Serial Application of a Particulate Filter System on a Common Rail Direct Injection Engine," SAE Paper No. 2000-01-0473, 14 pages, Feb. 2000.

Shamma, et al. "Approximate Set-Values Obeservers for Nonlinear Systems," IEEE Transactions on Automatic Control, vol. 42, No. 5, May 1997.

Soltis, "Current Status of NOx Sensor Development," Workshop on Sensor Needs and Requirements for PEM Fuel Cell Systems and Direct-Injection Engines, 9 pages, Jan. 25-26, 2000.

Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.

Storset, et al., "Air Charge Estimation for Turbocharged Diesel Engines," vol. 1 of Proceedings of the American Control Conference, 8 pages, Jun. 28-30, 2000.

The MathWorks, "Model-Based Calibration Toolbox 2.1 Calibrate complex powertrain systems," 4 pages, printed prior to filing date of present application.

The MathWorks, "Model-Based Calibration Toolbox 2.1.2," 2 pages, prior to filing date of present application.

Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

Zenlenka, et al., "An Active Regeneration as a Key Element for Safe Particulate Trap Use," SAE Paper No. 2001-0103199, 13 pages, Feb. 2001.

* cited by examiner

US 7,275,374 B2

COORDINATED MULTIVARIABLE CONTROL OF FUEL AND AIR IN ENGINES

CROSS-REFERENCE TO RELATED APPLICATIONS

The present application is a continuation-in-part of U.S. patent application Ser. No. 11/024,531 entitled "Multivariable Control For An Engine", U.S. patent application Ser. No. 11/025,221, entitled "Pedal Position And/Or Pedal Change Rate For Use In Control Of An Engine" and U.S. patent application Ser. No. 11/025,563 now U.S. Pat. No. 7,165,399 entitled "Method And System For Using A Measure Of Fueling Rate In The Air Side Control Of An Engine", all filed on Dec. 29, 2004.

FIELD

The present invention relates generally to engines and engine control. More specifically, the present invention pertains to methods for controlling the flow of fuel and air in engines.

BACKGROUND

Spark ignition engines typically have a gas pedal that is mechanically connected to an air throttle that meters air into the engine. Stepping on the gas pedal typically results in opening an air throttle, which allows more air into the engine. In some cases, a fuel injector controller adjusts the fuel that is provided to the engine to maintain a desired air/fuel ratio (AFR). The AFR is usually held close to a stoichiometric ratio (e.g. 14.6:1) to produce stoichiometric combustion, which helps minimize engine emissions and allows three-way catalysts to simultaneously remove hydrocarbons, carbon monoxide, and oxides of nitrogen ($NO_X$).

In contrast, compression ignition engines such as diesel engines do not usually operate at stoichiometric ratios, and thus typically result in greater emissions with different emission components. Because of recent increases in the use of diesel engines in the automotive and light truck markets, federal regulations have been passed requiring more stringent emission levels for diesel engines. Such regulations have prompted automakers to consider alternative methods for improving engine efficiency and reducing emissions.

Unlike spark ignition engines, the fuel pedal of a diesel engine is typically not directly connected to an air throttle that meters air into the engine. Instead, in those diesel engines equipped with electronic fuel injection (EFI), pedal position is often sensed by a pedal position sensor that senses pedal position and adjusts the fuel rate provided to the engine, allowing more or less fuel per fuel pump shot to be provided to the engine. In many modern diesel engines, the air to the engine is controlled by a turbocharger such as a Variable Nozzle Turbocharger (VNT) or waste-gate turbocharger. Typically, there is a time delay or "turbo lag" between when the operator engages the fuel pedal to inject more fuel and when the turbocharger spins-up to provide the additional air required to produce the desired AFR. This "turbo-lag" can reduce the responsiveness and performance of the engine, and can increase the amount of emissions discharged from the engine.

There are typically no sensors in the exhaust stream of a diesel engine that are analogous to those emissions sensors found in spark ignition engines. One reason for their absence is that diesel engines generally operate at about twice as lean as spark ignition engines. As such, the oxygen level in the exhaust of a diesel engine can be at a level where standard oxygen emission sensors do not provide useful information. At the same time, diesel engines typically burn too lean for conventional three-way catalysts. As a result, control over combustion in a diesel engine is typically performed in an "open-loop" manner, often relying on engine maps or the like to generate set points for the intake manifold parameters that are believed to be favorable for acceptable exhaust emissions.

SUMMARY

The present invention relates to methods for controlling the flow of both fuel and air in engines. An illustrative method in accordance with an exemplary embodiment of the present invention may include the steps of providing a combined fuel and air-side controller adapted to coordinate both the fuel-side and air-side control of an engine, sensing one or more parameters of the system, and outputting a fuel profile signal and one or more air-side control signals for controlling at least a part of the fuel-side and at least a part of the air-side of the engine. A number of sensors including a MAP sensor, MAF sensor, $NO_X$ sensor and/or particulate matter (PM) emissions sensor can be provided for sensing one or more of the parameters of the engine. One or more actuators can be further provided for controlling at least part of the operation of the engine based on the control signals received from the controller as well as other system components. In certain embodiments, the controller may be a multivariable Model Predictive Controller (MPC), which can be configured to compute one or more fuel and/or air-side parameters using a central optimization algorithm or routine.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
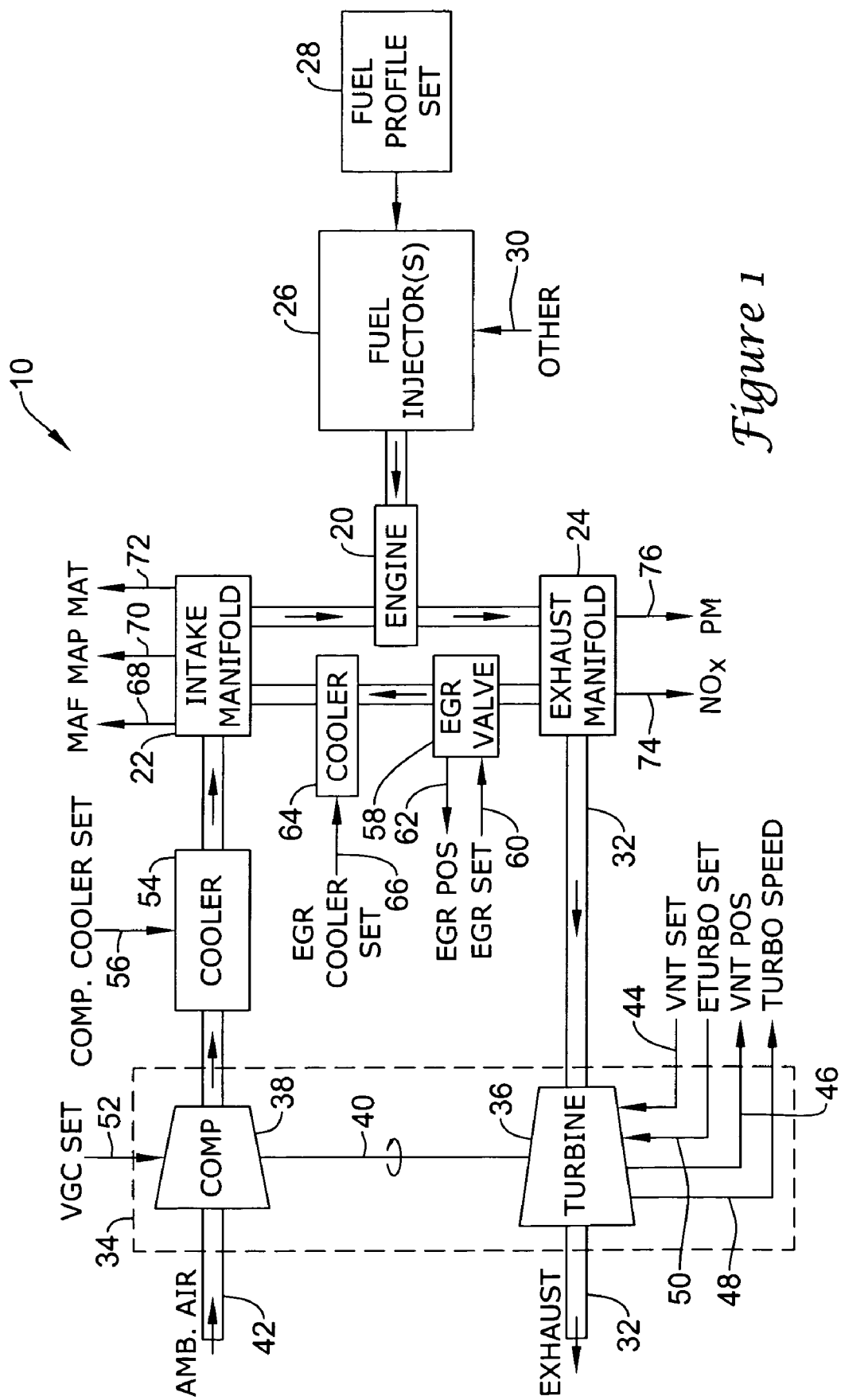
FIG. 1 is a schematic view of an illustrative diesel engine system in accordance with an exemplary embodiment of the present invention.

FIG. 1 is a schematic view of an illustrative diesel engine system in accordance with an exemplary embodiment of the present invention. The illustrative diesel engine system is generally shown at 10, and includes a diesel engine 20 having an intake manifold 22 and an exhaust manifold 24. In the illustrative embodiment, a fuel injector 26 provides fuel to the engine 20. The fuel injector 26 may include a single fuel injector, but more commonly may include a number of fuel injectors that are independently controllable. The fuel injector 26 can be configured to provide a desired fuel profile to the engine 20 based on a fuel profile set 28 as well as one or more other signals 30 relating to the fuel and/or air-side control of the engine 20. The term fuel "profile", as used herein, may include any number of fuel parameters or characteristics including, for example, fuel delivery rate, change in fuel delivery rate, fuel timing, fuel pre-injection event(s), fuel post-injection event(s), fuel pulses, and/or any other fuel delivery characteristic, as desired. One or more fuel side actuators may be used to control these and other fuel parameters, as desired.

As can be further seen in FIG. 1, exhaust from the engine 20 is provided to the exhaust manifold 24, which delivers the exhaust gas down an exhaust pipe 32. In the illustrative embodiment, a turbocharger 34 is further provided downstream of the exhaust manifold 24. The illustrative turbocharger 34 may include a turbine 36, which is driven by the exhaust gas flow. In the illustrative embodiment, the rotating turbine 36 drives a compressor 38 via a mechanical coupling 40. The compressor 38 receives ambient air through passageway 42, compresses the ambient air, and then provides compressed air to the intake manifold 22, as shown.

The turbocharger 34 may be a variable nozzle turbine (VNT) turbocharger. However, it is contemplated that any suitable turbocharger may be used, including, for example, a waste gated turbocharger or a variable geometry inlet nozzle turbocharger (VGT) with an actuator to operate the waste gate or VGT vane set. The illustrative VNT turbocharger uses adjustable vanes inside an exhaust scroll to change the angle of attack of the incoming exhaust gasses as they strike the exhaust turbine 36. In the illustrative embodiment, the angle of attack of the vanes, and thus the amount of boost pressure (MAP) provided by the compressor 38, may be controlled by a VNT SET signal 44. In some cases, a VNT POS signal 46 can be provided to indicate the current vane position. A TURBO SPEED signal 48 may also be provided to indicate the current turbine speed, which in some cases can be utilized to limit the turbo speed to help prevent damage to the turbine 36.

To reduce turbo lag, the turbine 36 may include an electrical motor assist (not explicitly shown). Although not required in all embodiments, the electric motor assist may help increase the speed of the turbine 36 and thus the boost pressure provided by the compressor 38 to the intake manifold 22. This may be particularly useful when the engine 20 is at low engine speeds and when higher boost pressure is desired, such as under high acceleration conditions. Under these conditions, the exhaust gas flow may be insufficient to generate the desired boost pressure (MAP) at the intake manifold 22. In some embodiments, an ETURBO SET signal 50 may be provided to control the amount of electric motor assist that is provided.

The compressor 38 may comprise either a variable or non-variable compressor. In certain cases, for example, the compressed air that is provided by the compressor 38 may be only a function of the speed at which the turbine 36 rotates the compressor 38. In other cases, the compressor 38 may be a variable geometry compressor (VGC), wherein a VGC SET signal 52 can be used to set the vane position at the outlet of the compressor 38 to provide a controlled amount of compressed air to the intake manifold 22, as desired.

A compressed air cooler 54 may be provided to help cool the compressed air before it is provided to the intake manifold 22. In some embodiments, one or more compressed air COMP. COOLER SET signals 56 may be provided to the compressed air cooler 54 to help control the temperature of the compressed air that is ultimately provided to the intake manifold 22. In some cases, the one or more COMP. COOLER SET signals 56 may be provided by a combined fuel and air-side controller (see FIGS. 2 and 3), if desired.

In certain embodiments, and to reduce the emissions of some diesel engines, an Exhaust Gas Recirculation (EGR) valve 58 may be inserted between the exhaust manifold 24 and the intake manifold 22, as shown. In the illustrative embodiment, the EGR valve 58 accepts an EGR SET signal 60, which is used to set the desired amount of exhaust gas recirculation (EGR). An EGR POS signal 62 indicating the current position of the EGR valve 58 may also be provided, if desired.

In some cases, an EGR cooler 64 may be provided either upstream or downstream of the EGR valve 58 to help cool the exhaust gas before it is provided to the intake manifold 22. In some embodiments, one or more EGR COOLER SET signals 66 may be provided to the EGR cooler 64 to help control the temperature of the recirculated exhaust gas. In some cases, the one or more EGR COOLER SET signals 66 may be provided by a combined fuel and air-side controller (see FIGS. 2), if desired.

A number of sensors may be provided for monitoring the operation of the engine 20. For example, an intake manifold air flow (MAF) sensor 68 may provide a measure of the intake manifold air flow (MAF). An intake manifold air pressure (MAP) sensor 70, in turn, may provide a measure of the intake manifold air pressure (MAP). A manifold air temperature (MAT) sensor 72 may provide a measure of the intake manifold air temperature (MAT). A $NO_X$ sensor 74 may provide a measure of the $NO_X$ concentration in the exhaust gas. Similarly, a Particular Matter (PM) sensor 76 may provide a measure of the particulate matter concentration in the exhaust gas. While the $NO_X$ sensor 74 and PM sensor 76 are shown located at the exhaust manifold 24, it is contemplated that these sensors may be provided anywhere downstream of the engine 20, as desired. In addition, the sensors shown in FIG. 1 are only illustrative, and it is contemplated that more or less sensors may be provided, as desired.

Figure 2:
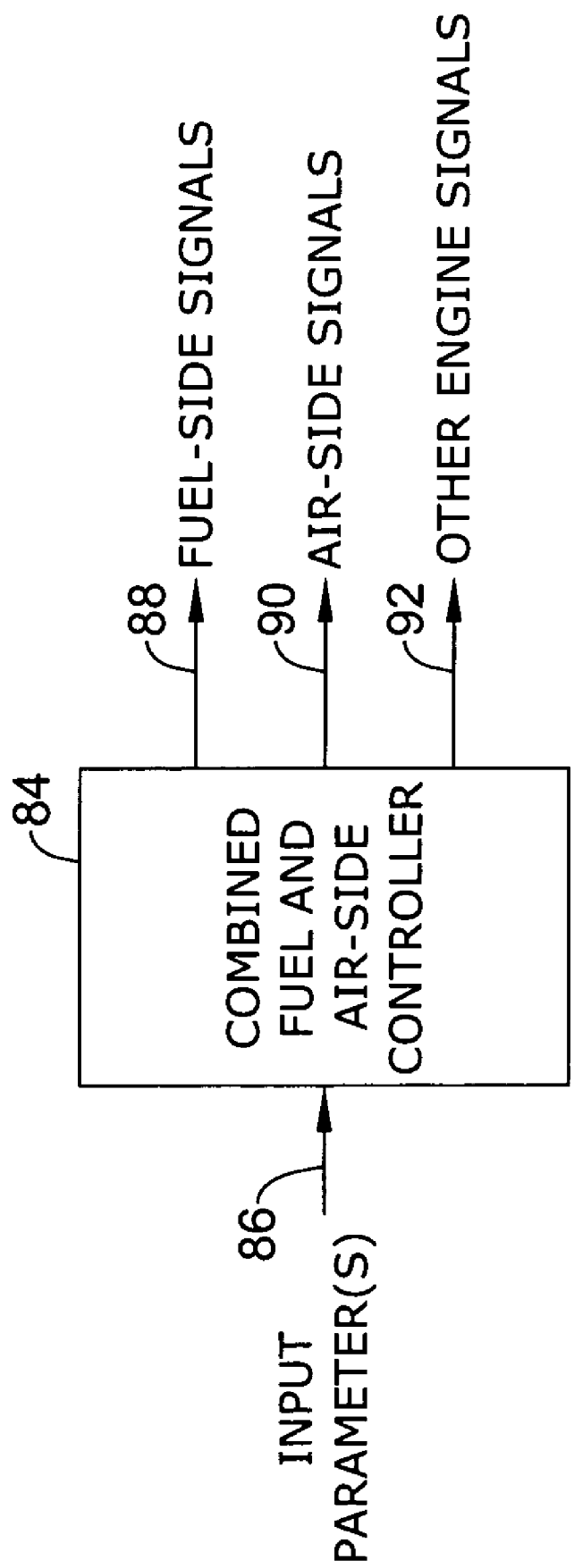
FIG. 2 is a schematic view of an illustrative combined fuel and air-side controller for use with the illustrative diesel engine system of FIG. 1.

FIG. 2 is a schematic view of an illustrative combined fuel and air-side controller 84 for use with the illustrative diesel engine system 10 of FIG. 1. As can be seen in FIG. 2, the controller 84 can be configured to receive a number of input parameters 86 that can be utilized to provide both fuel and air-side control of the engine 20. The controller 84 can be configured to output one or more fuel-side signals 88 that can be utilized to control various fuel actuators and/or fuel parameters for controlling the fuel profile delivered to the engine 20 via the fuel injector(s) 26. In addition, the controller 84 can be configured to output one or more air-side signals 90 for controlling the intake manifold 22, exhaust manifold 24, turbocharger 34, compressor cooler 54, EGR valve 58, and/or other air-side engine components. In certain embodiments, the controller 84 can be further configured to output a number of other engine signals 92 that can be used to control various other functions of the engine system 10 such as the transmission, engine coolant system, cruise control system, etc.

Figure 3:
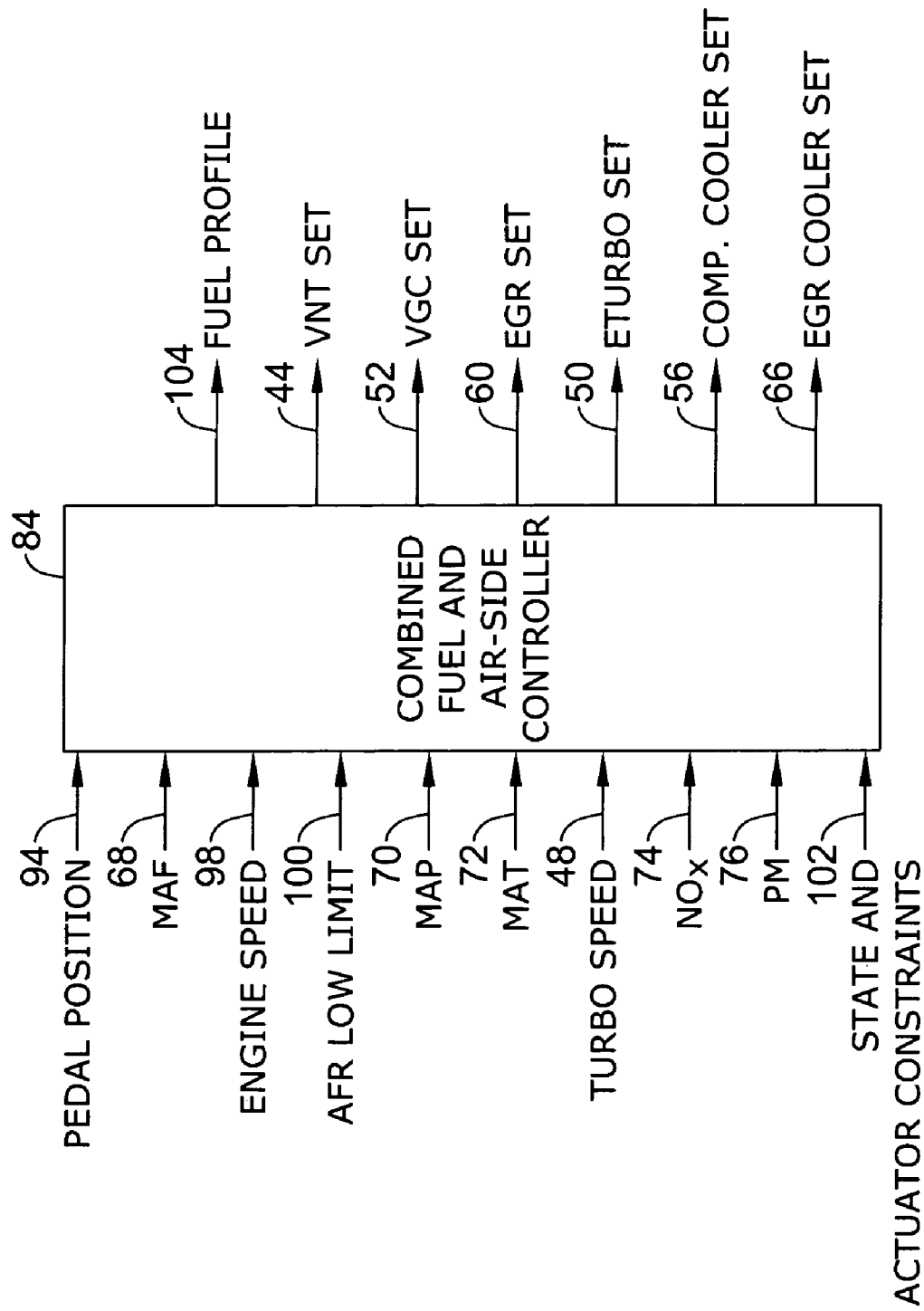
FIG. 3 is a schematic view of an illustrative combined fuel and air-side controller in accordance with another exemplary embodiment of the present invention.

Turning now to FIG. 3, a specific embodiment of the illustrative controller 84 of FIG. 2 will now be described. As can be seen in FIG. 3, the controller 84 can be configured to receive various input signals relating to the fuel-side control of the engine 20, including, for example, a PEDAL POSITION signal 94, the MAF signal 68, an ENGINE SPEED signal 98, and/or the AFR LOW LIMIT signal 100, each of which can be provided as a part of the fuel profile set 28 depicted in FIG. 1. In addition, the controller 84 can be configured to receive various other input signals relating to the air-side control of the engine 20, including, for example, the MAP signal 70, the MAT signal 72, the TURBO SPEED signal 48, the $NO_X$ signal 74, and/or the PM signal 76, as shown in FIG. 1. While the illustrative embodiment of FIG. 3 shows the use of several engine parameters for the coordinated control of both the fuel and air-sides of the engine 20, it should be understood that the controller 84 could be configured to control only one side (e.g. the fuel side) of the engine 20, if desired. Moreover, the controller 84 can be configured to receive and output other parameters and/or signals, depending on the particular application. In some embodiments, for example, the controller 84 can be configured to receive various state and actuator constraints 102, if desired.

Based on the values of the input parameters 86 received, the controller 84 may provide a number of control outputs to help provide fuel and/or air-side control to the engine 20. In certain embodiments, and as further shown in FIG. 3, for example, the controller 84 can be configured to output a FUEL PROFILE signal 104 that can be utilized to adjust the various fuel parameters of the fuel injection system including, for example, the fuel delivery rate, the change in fuel delivery rate, the fuel timing, any fuel pre-injection event(s), any fuel post-injection event(s), the fuel pulse on/off time, and/or other such fuel delivery characteristic, as desired.

As can be further seen in FIG. 3, the controller 84 can be further configured to output other parameters for the air-side control of the engine 20, including, for example, the VNT SET signal 44, the VGC SET signal 52, the EGR SET signal 60, and in some cases, the ETURBO SET signal 50, the COMP. COOLER SET signal 56, and the EGR COOLER SET signal 66, each of which can be seen in FIG. 1. Other output signals and/or parameters are possible, however, depending on the application.

In some embodiments, the controller 84 may comprise a multivariable Model Predictive Controller (MPC). The MPC may include a model of the dynamic process of engine operation, and may provide predictive control signals to the engine 20 subject to constraints in control variables and measured output variables. The models may be static and/or dynamic, depending on the application. In some cases, the models may produce one or more output signals y(t) from one or more input signals u(t). A dynamic model typically contains a static model plus information about the time response of the system. Thus, a dynamic model is often of higher fidelity than a static model.

In mathematical terms, a linear dynamic model has the form:

$$y(t)=B_0*u(t)+B_1*u(t-1)+\ldots+B_n*u(t-n)+A_1*y(t-1)+\ldots+A_m*y(t-m) \quad (1)$$

wherein $B_0 \ldots B_n$ and $A_1 \ldots A_m$ are constant matrices.

In a dynamic model, y(t) represents the output at time t, and is based on the current input u(t), one or more past inputs u(t-1), ..., u(t-n), and one or more past outputs y(t-1) ... y(t-m). A static model, in turn, is a special case where the matrices $B_1 = \ldots = B_n = 0$, and $A_1 = \ldots = A_m = 0$, which can be expressed by the simpler relationship:

$$y(t)=B_0*u(t) \quad (2)$$

wherein $B_0$ is a simple matrix multiplier. Since a static model does not have a "memory" of either the past inputs u(t-1) ... u(t-n) or the past outputs y(t-1) ... y(t-m), such model tends to be simpler, but may be less powerful in modeling some dynamic system parameters.

For turbocharged diesel engine systems, the system dynamics can be relatively complicated and several of the interactions may have characteristics known as "non-minimum phase". Non minimum phase is a dynamic response where the output y(t), when exposed to a step in input u(t) will initially move in one direction, and then turn around and move towards its steady state in the opposite direction. The soot emission in a diesel engine is one example of such phenomenon. In some cases, these dynamics may be important for optimal operation of the control system. Thus, dynamic models are often preferred, at least when modeling some control parameters.

In one example, the MPC may include a multivariable model that models the effect of changes in one or more actuators of the engine (e.g. VNT SET 44, EGR SET 60, COMP. COOLER SET 56, EGR COOLER SET 66, ETURBO SET 50, fueling rate, etc.) on each of two or more input parameters (e.g. AFR LOW LIMIT 100, MAP 70, MAF 72, $NO_X$ 74, PM 76, etc.), and then controls the actuators to produce a desired response in at least one of the two or more parameters. Likewise, the model may, in some cases, model the effects of simultaneous changes in two or more actuators on each of one or more engine parameters, and then control at least one of the actuators to produce a desired response in each of the one or more input parameters.

In one illustrative embodiment, for example, a state-space model of a discrete time dynamical system may be represented using equations of the form:

$$x(t+1)=Ax(t)+Bu(t)$$

$$y(t)=Cx(t)$$

The model predictive algorithm involves solving the problem:

$u(k)=\arg\min\{J\}$, where the function $J$ is given by:

$$J = \hat{x}(t+N_y|t)^T P \hat{x}(t+N_y|t) + \sum_{k=0}^{N_y-1}[\hat{x}(t+k|t)^T Q \hat{x}(t+k|t) + u(t+k)^T R u(t+k)]$$

Subject to Constraints $$y_{min} \leq \hat{y}(t+k|t) \leq y_{max}$$

$$u_{min} \leq u(t+k) \leq u_{max}$$

$$x(t|t)=x(t)$$

$$\hat{x}(t+k+1|t)=A\hat{x}(t+k|t)+Bu(t+k)$$

$$\hat{y}(t+k|t)=C\hat{x}(t+k|t)$$

In some embodiments, this is transformed into a Quadratic Programming (QP) problem and solved with standard or customized tools.

The variable "y(k)" contains the sensor measurements (for the turbocharger problem, these include but are not limited to MAF 68, MAP 70, MAT 72, TURBO SPEED 48, $NO_X$ 74, PM 76, etc). The variables $\hat{y}$(k+t|t) denote the outputs of the system predicted at time "t+k" when the measurements "y(t)" are available. They are used in the model predictive controller to choose the sequence of inputs that yields the "best" (according to performance index J) predicted sequence of outputs.

The variables "u(k)" are produced by optimizing J and, in some cases, are used for the actuator set points. For the turbocharger problem these include, but are not limited to, VNT SET 44, EGR SET 60, COMP. COOLER SET 56, EGR COOLER SET 66, ETURBO SET 50, etc. The variable "x(k)" is a variable representing an internal state of the dynamical state space model of the system. The variable $\hat{x}$(t+k|t) indicates the predicted version of the state variable k discrete time steps into the future and is used in the MPC to optimize the future values of the system.

The variables $y_{min}$ and $y_{max}$ are constraints and indicate, respectively, the minimum and maximum values that the system predicted measurements $\hat{y}$(k) are permitted to attain. These often correspond to hard limits on the closed-loop behavior in the control system. For example, a hard limit may be placed on the PM emissions such that they are not permitted to exceed a certain number of grams per second at some given time. In some cases, only a minimum $y_{min}$ or maximum $y_{max}$ constraint is provided. For example, a maximum PM emission constraint may be provided, while a minimum PM emission constraint may be unnecessary or undesirable.

The variables $u_{min}$ and $u_{max}$ are also constraints, and indicate the minimum and maximum values that the system actuators $\hat{u}$(k) are permitted to attain, often corresponding to physical limitations on the actuators. For example, the EGR valve 58 may have a minimum of zero corresponding to a fully closed valve position and a maximum value of one corresponding to the fully open valve position. Like above, and in some embodiments, only a minimum $u_{min}$ or maximum $u_{max}$ constraint may be provided, depending on the circumstances. Also, some or all of the constraints (e.g. $y_{min}$, $y_{max}$, $u_{min}$, $u_{max}$) may vary in time, depending on the current operating conditions. The state and actuator constraints may be provided to the controller 84 of FIGS. 2-3 via interface 102, if desired.

The constant matrices P, Q, R are often positive definite matrices used to set a penalty on the optimization of the respective variables. These are used in practice to "tune" the closed-loop response of the system.

Figure 4:
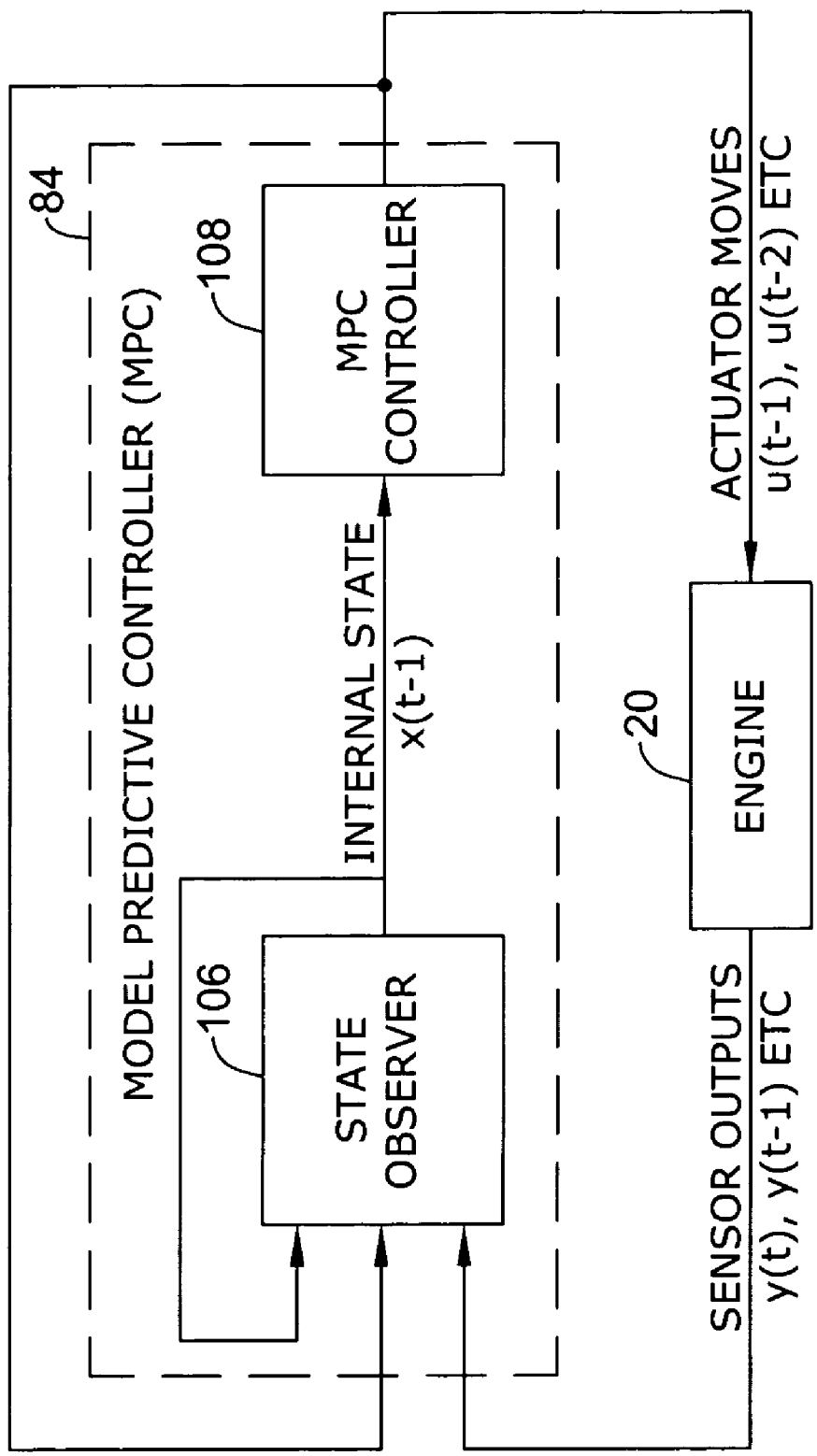
FIG. 4 is a schematic view of an illustrative model predictive controller in accordance with an exemplary embodiment of the present invention.

FIG. 4 is a schematic view of an illustrative model predictive controller in accordance with an exemplary embodiment of the present invention. As shown in FIG. 4, the MPC 84 may include a State Observer 106 and a MPC Controller 108. As described above, the MPC Controller 108 provides a number of control outputs "u" to actuators or the like of the engine 20. Illustrative control outputs include, for example, the FUEL PROFILE signal 104, the VNT SET signal 44, the VGC set signal 52, the EGR SET signal 60, the ETURBO SET signal 50, the COMP. COOLER SET signal 56, and the EGR COOLER SET signal 66, all shown and described above with respect to FIGS. 1 and 3. The MPC Controller 108 may include a memory for storing past values of the control outputs u(t), u(t−1), u(t−2), etc.

The State Observer 106 receives a number of inputs "y", a number of control outputs "u", and a number of internal variables "x". Illustrative inputs "y" may include, for example, the PEDAL POSITION signal 94, the MAF signal 68, the ENGINE SPEED signal 98, the AFR LOW LIMIT signal 100, the MAP signal 70, the MAT signal 72, the TURBO SPEED signal 48, the $NO_X$ signal 74, and/or the PM signal 76, as shown and described above with respect to FIGS. 1 and 3. It is contemplated that the inputs "y" may be interrogated constantly, intermittently, or periodically, or at any other time, as desired. Also, these input parameters are only illustrative, and it is contemplated that more or less input signals may be provided, depending on the application. In some cases, the State Observer 106 may receive present and/or past values for each of the number of inputs "y", the number of control outputs "u", and a number of internal state variables "x", depending on the application.

The State Observer 106 produces a current set of state variables "x", which are then provided to the MPC Controller 108. The MPC Controller 108 then calculates new control outputs "u", which are presented to actuators or the like on the engine 20. The control outputs "u" may be updated constantly, intermittently, or periodically, or at any other time, as desired. The engine 20 operates using the new control outputs "u", and produces new inputs "y" accordingly.

In one illustrative embodiment, the MPC 84 can be programmed using standard Quadratic Programming (QP) and/or Linear Programming (LP) techniques to predict values for the control outputs "u" so that the engine 20 produces inputs "y" that are at a desired target value, within a desired target range, and/or that do not violate any predefined constraints. For example, by knowing the impact of the VNT SET signal 44, the EGR SET signal 60 and/or the ETURBO SET signal 50 on the $NO_X$ and/or PM emissions, the MPC 84 may predict values for the control output VNT SET signal 44, EGR SET signal 60 and/or the ETURBO SET signal 50 so that future values of the $NO_X$ 74 and/or PM emissions signals 76 are at or remain at a desired target value, within a desired target range, and/or do not violate current constraints. This prediction capability may be particularly useful since there is often a "turbo lag" (e.g. 1 second) from when a change in the VNT SET signal 44, EGR SET signal 60 and/or the ETURBO SET signal 50 occurs and when the resulting change in the $NO_X$ and/or PM emissions signals 74,76 occurs. In some cases, the constraints may change, and may depend on the current operating conditions.

It is contemplated that the MPC 84 may be implemented in the form of online optimization and/or by using equivalent lookup tables computed with a hybrid multi-parametric algorithm depending on the complexity of the problem. Hybrid multi-parametric algorithms may allow constraints on emission parameters as well as multiple system operating modes to be encoded into a lookup table that can be implemented in an Engine Control Unit (ECU) of a vehicle. The emission constraints can be time-varying signals, which enter the lookup table as additional parameters. Hybrid multi-parametric algorithms are further described by F. Borrelli in "*Constrained Optimal Control of Linear and Hybrid Systems*", volume 290 of Lecture Notes in Control and Information Sciences, Springer, 2003, which is incorporated herein by reference.

Alternatively, or in addition, the MPC 84 may include one or more Proportional-Integral-Derivative (PID) control loops, one or more predictive constrained control loops (e.g. a Smith predictor control loop), one or more multiparametric control loops, one or more multivariable control loops, one or more dynamic matrix control loops, one or more statistical processes control loop, a knowledge based expert system, a neural network, fuzzy logic or any other suitable control mechanism, as desired. Also, it is contemplated that the MPC 84 may provide commands and/or set points for lower-level controllers that are used to control the actuators of the engine. In some cases, the lower level controllers may be, for example, single-input-single-output (SISO) controllers such as PID controllers.

Figure 5:
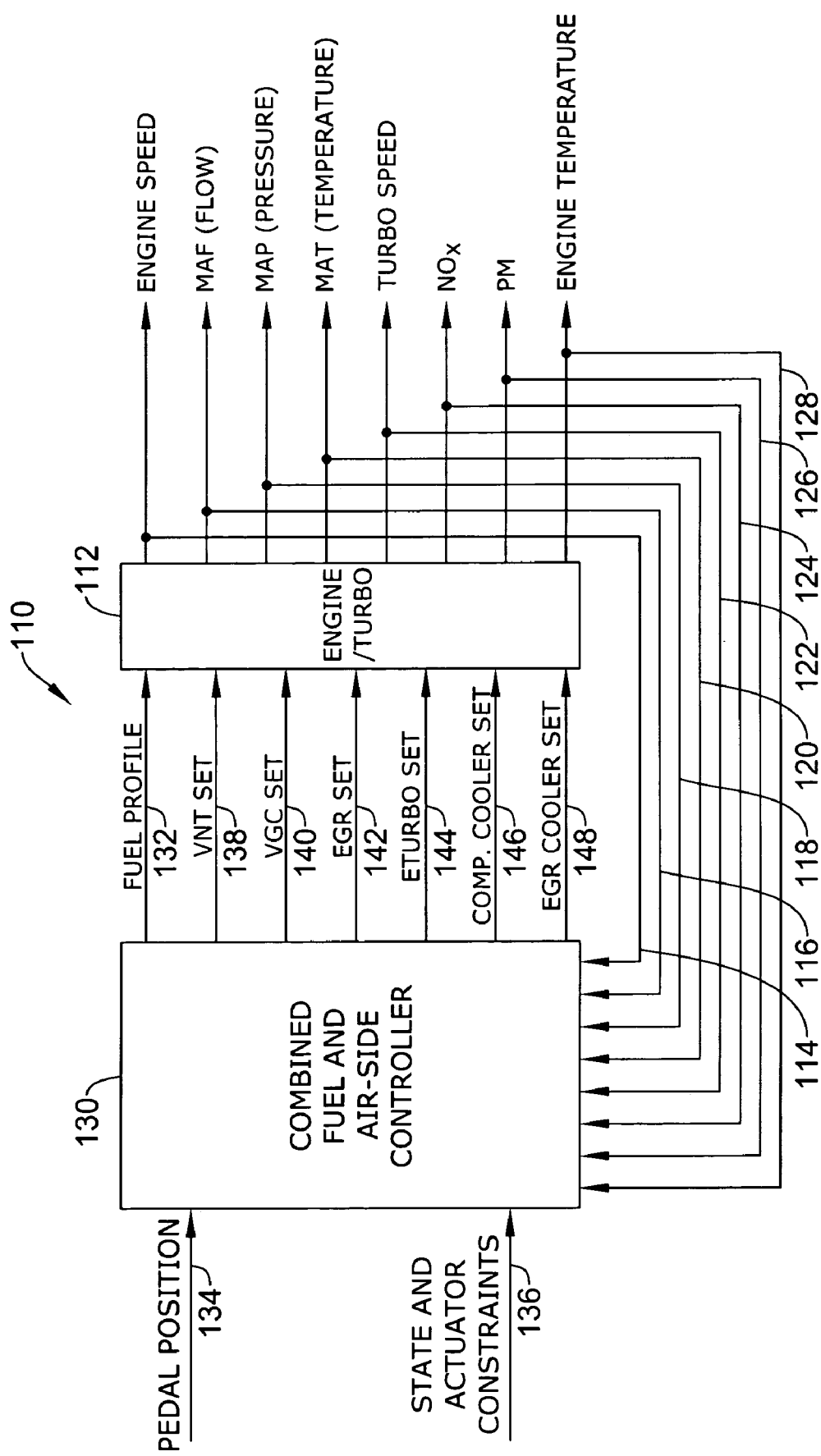
FIG. 5 is a schematic view of another illustrative diesel engine system in accordance with an exemplary embodiment of the present invention employing a combined fuel and air-side controller.

FIG. 5 is a schematic view of another illustrative diesel engine system in accordance with an exemplary embodiment of the present invention employing a combined fuel and air-side controller. The illustrative diesel engine system, represented generally by reference number 110, can include a diesel engine 112 coupled to a variable nozzle turbine (VNT) turbocharger with electric motor assist and an Exhaust Gas Recirculation (EGR) valve that is inserted between the engine exhaust manifold and the engine intake manifold. Alternatively, and in other embodiments, the diesel engine 112 can include other types of turbochargers along with the EGR valve, including, for example, a variable geometry inlet nozzle turbocharger (VGT) or waste-gate turbocharger, if desired. As with the illustrative embodiment of FIG. 1, the diesel engine system 110 may include other components such as a compressor cooler, EGR cooler, etc., as desired.

A number of sensor outputs can be provided for monitoring various parameters of the engine 112 during operation. In certain embodiments, for example, the illustrative sensor outputs of the engine 112 may include an ENGINE SPEED signal 114, an intake MAF signal 116, an intake MAP signal 118, an intake MAT signal 120, a TURBO SPEED signal 122, a $NO_X$ signal 124, a PM signal 126, and an ENGINE TEMPERATURE sense signal 128, as shown. As with other embodiments herein, the number and/or type of engine sensor outputs provided may vary, depending on the application.

As can be further seen in FIG. 5, a combined fuel and air-side controller 130 can be coupled to the engine 112 and tasked to coordinate both the fuel and air-side control of the engine 112, including the fuel profile 132 delivered to the engine 112 by the fuel injectors. In some embodiments, a PEDAL POSITION signal 134 and a STATE AND ACTUATOR CONSTRAINTS signal 136 can be used by the controller 130 to calculate the desired amount of fuel for the engine 112. Other input signals such as that described above with respect to FIG. 3 may also be inputted to the combined fuel and air-side controller 130, if desired. In some cases, stepping on the pedal increases the fuel flow in a manner dictated by one or more static and/or dynamic control maps, as described herein.

By knowing the impact of fueling rate and/or a change in fueling rate on various engine parameters such as MAP, MAF, MAT, TURBO SPEED, $NO_X$ emissions, PM emissions, etc., the controller 130 may adjust one or more control signals such as the VNT SET signal 138, VGC SET signal 140, EGR SET signal 142, the ETURBO SET signal 144, the COMP. COOLER SET signal 146 and/or the EGR COOLER SET signal 148 to cancel or mitigate disrupting effects on, for example, MAP, MAF, turbo speed, $NO_X$ emissions, PM emissions, etc. In use, the control of these signals may help to improve the responsiveness, performance, and/or emissions of the engine.

In addition to controlling the fuel profile 132 delivered to the engine 112, the illustrative controller 130 can be further configured to coordinate the air-side control of the engine 112. The term "air-side control", as used herein, may include both intake air and exhaust or emission control. In the illustrative embodiment of FIG. 5, for example, the controller 130 can be configured to receive input signals such as the MAF signal 116, the MAP signal 118, the MAT signal 120, the TURBO SPEED signal 122, the $NO_X$ signal 124, the PM signal 126, and/or the ENGINE TEMPERATURE signal 128. These input parameters are only illustrative, and it is contemplated that more or less input signals may be received, depending on the application.

Based on the value(s) of the current and/or past-received input parameters, the illustrative controller 130 may provide a number of control outputs to help provide fuel and/or air-side control to the engine 112. In certain embodiments, for example, the controller 130 can provide a FUEL PROFILE signal 132, a VNT SET signal 138, a VGC SET signal 140, an EGR SET signal 142, an ETURBO SET signal 144, a COMP. COOLER SET signal 146, and an EGR COOLER SET signal 148, as shown in FIG. 5. It should be understood, however, that other control outputs can be provided to the engine 112, depending on the application. In some cases, the controller 130 may be similar to the controller 84 of FIG. 3.

Figure 6:
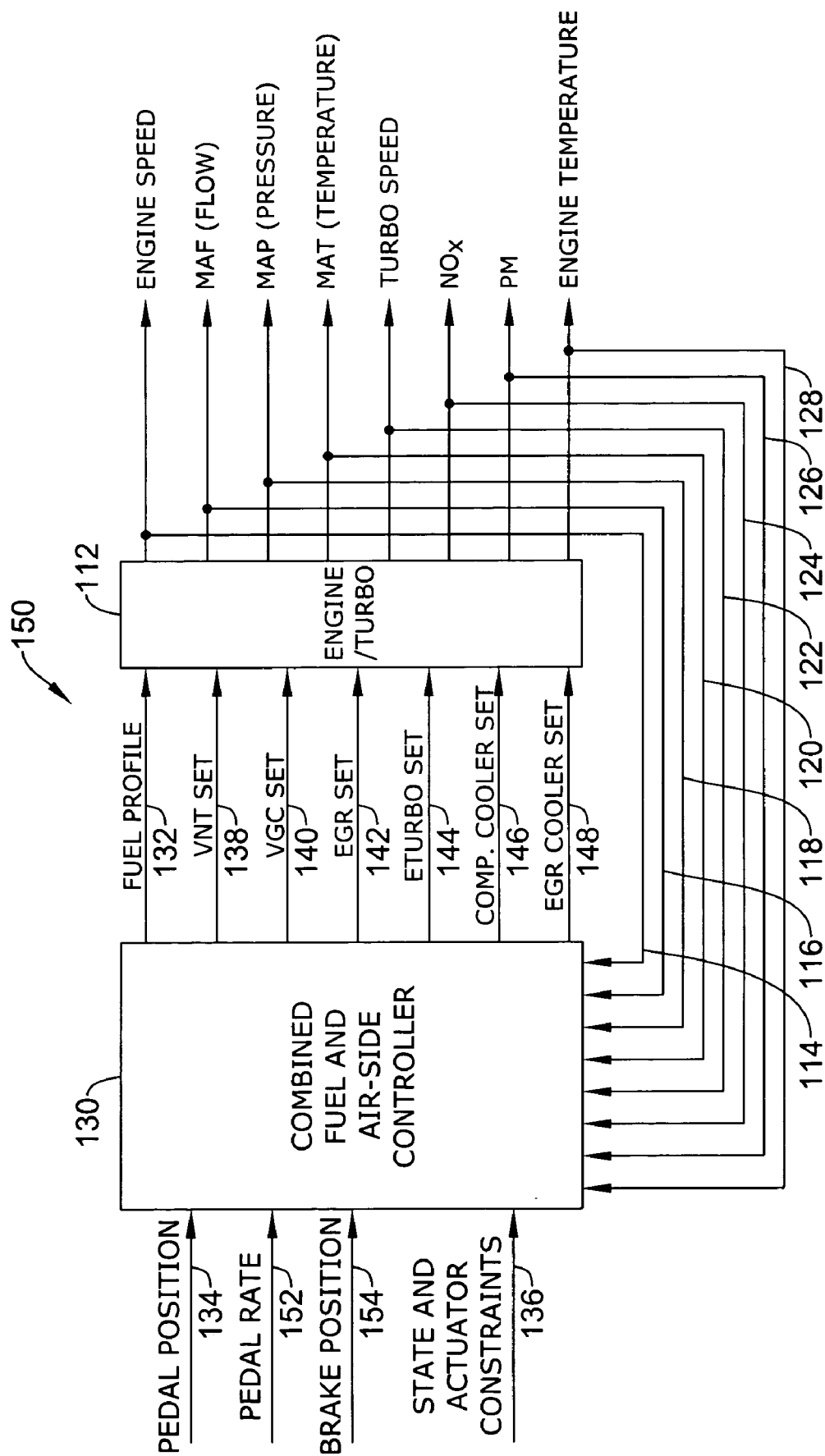
FIG. 6 is a schematic view of another illustrative diesel engine system in accordance with an exemplary embodiment of the present invention employing a combined fuel and air-side controller.

FIG. 6 is a schematic view of another illustrative diesel engine system 150 in accordance with an exemplary embodiment of the present invention. Diesel engine system 150 is similar to that described above with respect to FIG. 5, with like elements in each drawing numbered in like fashion. In the illustrative embodiment of FIG. 6, however, the controller 130 can be further configured to receive a PEDAL RATE signal 152 and a BRAKE POSITION signal 154 that can be further used by the controller 130 to regulate the fuel and/or air-side control of the engine, if desired.

In some cases, the PEDAL RATE signal 152 can be utilized in conjunction with the PEDAL POSITION signal 134 to anticipate future fuel and/or air needs by determining the change in rate at which the fuel pedal is being engaged or disengaged. In similar fashion, the BRAKE POSITION signal 154 can be used to anticipate future fuel and/or air-side needs based, for example, on the pressure exerted on the brake by the driver, the brake rate, and/or the brake travel. Using such input signals 152,154, the controller 130 may anticipate the future fuel and/or air needs of the engine, and may adjust the fuel profile and/or air profile to meet those anticipated needs.

Figure 7:
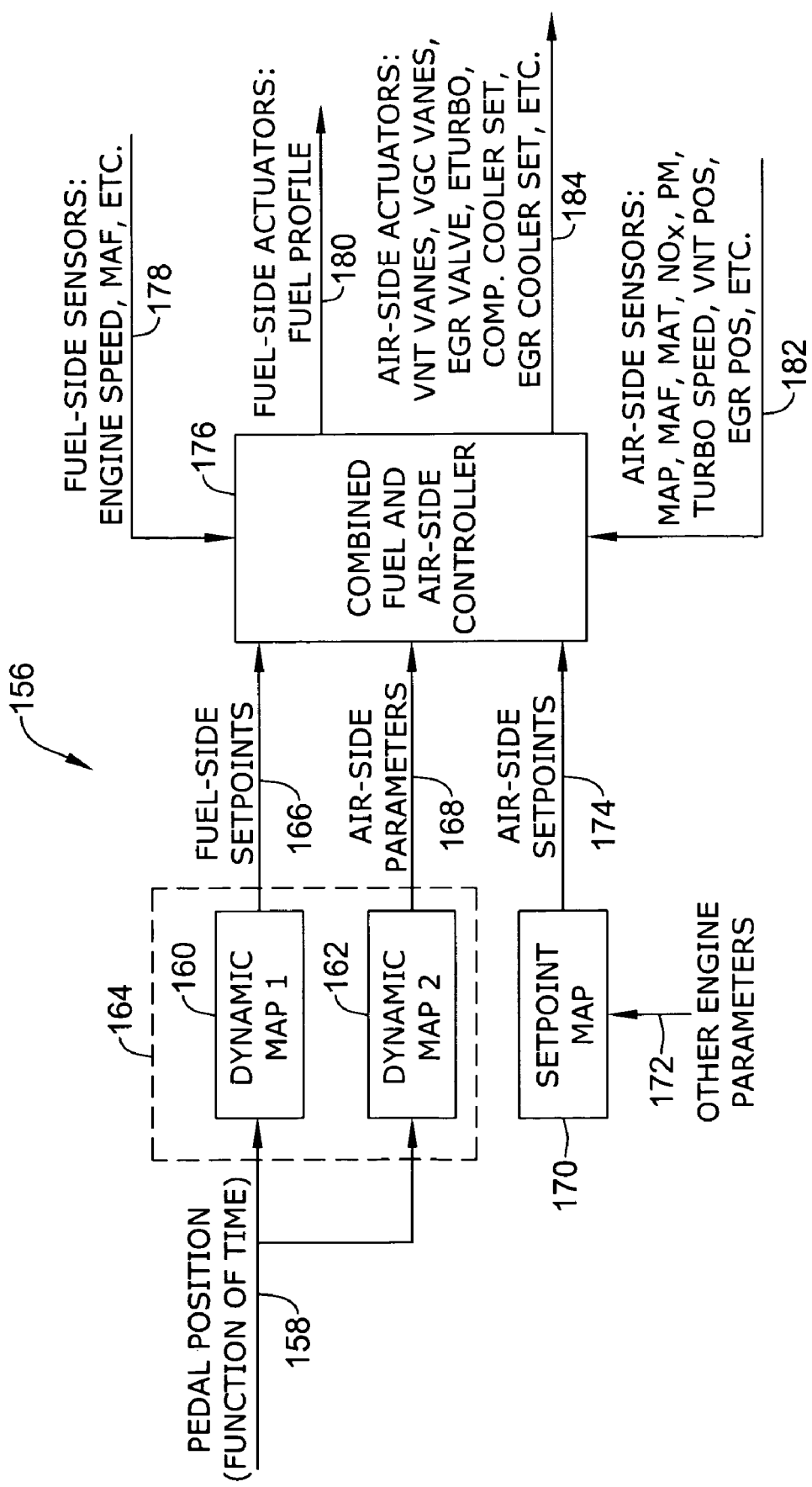
FIG. 7 is a schematic view of another illustrative diesel engine system in accordance with an exemplary embodiment of the present invention employing a combined fuel and air-side controller.

FIG. 7 is a schematic view of another illustrative diesel engine system 156 in accordance with an exemplary embodiment of the present invention employing a combined fuel and air-side controller. In the illustrative embodiment of FIG. 7, a PEDAL POSITION signal 158 is shown provided to a fuel-side position and rate map 160 and an air-side position and rate map 162, which can be dynamic maps, static maps, or combinations thereof. As indicated by the dashed box 164 in FIG. 7, the maps 160,162 can both be provided as a single (i.e. integral) map for controlling both the fuel and air-sides of the engine. It should be understood, however, that the maps 160,162 could be implemented separately, if desired.

In the illustrative embodiment, the fuel-side position and rate map 160 may translate the pedal position and/or pedal change rate (and in some cases, further derivatives of the pedal position) into one or more fuel-side set points 166. The air-side position and rate map 162, in turn, may translate the pedal position and/or pedal change rate (and in some cases, further derivates of the pedal position) into one or more air-side parameters 168. In some embodiments, another air-side set point map 170 may receive a number of other engine parameters 172 such as a brake position parameter, a VNT position parameter, an outside air temperature parameter, an outside air pressure parameter, an engine temperature parameter, a humidity parameter and/or any other desired parameter, which may be provided to the set point map 170 as one or more air-side set points 174.

A combined fuel and air-side controller 176 can be configured to receive one or more fuel and air-side set points and/or parameters from the fuel-side position and rate map 160, the air-side position and rate map 162, and, in some cases, the air-side set points 174 from the air-side set point map 170. The combined fuel and air-side controller 176 can be further configured to receive various sensor signals from both the fuel and air-sides of the engine. In certain embodiments, for example, the combined fuel and air-side controller 176 can be configured to receive a number of fuel-side signals 178 such as ENGINE SPEED, MAF, etc., which can then be provided as a FUEL PROFILE signal 180 to one or more fuel-side actuators (e.g. fuel injectors) of the engine.

For air-side control of the engine, the combined fuel and air-side controller 176 can be configured to receive a number of air-side signals 182 such as MAF, MAP, MAT, $NO_X$, PM, TURBO SPEED, VNT POS, EGR POS, etc., which in combination with the optional air-side set points 174 provided by the set point map 170, can be provided as one or more air-side control signals 184 such as VNT SET, VGC SET, EGR SET, ETURBO SET, COMP. COOLER SET, EGR COOLER SET, etc., as desired.

In certain embodiments, the combined fuel and air-side controller 176 may be a multivariable Model Predictive Controller (MPC), which can be configured to compute all of the actuator signals using a central optimization algorithm or routine. As with other embodiments herein, the combined fuel and air-side controller 176 may be implemented in the form of online optimization and/or by using equivalent lookup tables computed with a hybrid multi-parametric algorithm depending on the complexity of the problem. Hybrid multi-parametric algorithms may allow constraints on emission parameters as well as multiple system operating modes to be encoded into a lookup table, which can be implemented in an Engine Control Unit (ECU) of a vehicle. The emission constraints can be time-varying signals that enter the lookup table as additional parameters.

Alternatively, or in addition, the combined fuel and air-side controller 176 may include one or more Proportional-Integral-Derivative (PID) control loops, one or more predictive constrained control loops (e.g. a Smith predictor control loop), one or more multiparametric control loops, one or more multivariable control loops, one or more dynamic matrix control loops, one or more statistical processes control loop, a knowledge based expert system, a neural network, fuzzy logic or any other suitable control mechanism, as desired. Also, it is contemplated that the combined fuel and air-side controller 176 may provide commands and/or set points for lower-level controllers that are used to control the actuators of the engine. In some cases, the lower level controllers may be, for example, single-input-single-output (SISO) controllers such as PID controllers.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A method for controlling a diesel engine system, the diesel engine system including a diesel engine having a fuel-side and an air-side, the fuel-side of said diesel engine including at least one fuel injector, the air-side of said diesel engine including an intake manifold, an exhaust manifold, and a turbine adapted to drive a compressor for providing compressed air to the intake manifold, the method comprising the steps of:

providing a combined fuel and air-side controller adapted to coordinate both the fuel-side and air-side control of the engine;

sensing one or more fuel-side parameters and one or more air-side parameters; and outputting a fuel profile signal and one or more air-side control signals for controlling at least a part of the fuel-side and at least a part of the air-side of the engine;

wherein the combined fuel and air-side controller includes a multivariable Model Predictive Controller adapted to compute both the fuel and air-side parameters using a central optimization algorithm or routine.

2. The method of claim 1, wherein said one or more fuel-side parameters includes a pedal rate signal.

3. The method of claim 1, wherein said one or more fuel-side parameters includes a brake position signal.

4. The method of claim 1, wherein said one of more fuel-side parameters is selected from the group of signals consisting of a pedal position signal, a MAF signal, an engine speed signal, an AFR low limit signal, a pedal rate signal, and a brake position signal.

5. The method of claim 1, wherein said one or more air-side parameters includes a $NO_X$ emission signal.

6. The method of claim 1, wherein said one or more air-side parameters includes a particulate matter (PM) emission signal.

7. The method of claim 1, wherein said one or more air-side parameters is selected from the group of signals consisting of a MAF signal, a MAP signal, a MAT signal, a $NO_X$ signal, a PM signal, a turbo speed signal, a VNT position signal, and an EGR position signal.

8. The method of claim 1, wherein said one or more air-side control signals are selected from the group of signals consisting of a VNT set signal, a VGC set signal, an EGR set signal, an ETURBO set signal, a compressor cooler set signal, and an EGR cooler signal.

9. A method for controlling a diesel engine system, the diesel engine system including a diesel engine having a fuel-side and an air-side, the fuel-side of said diesel engine including at least one fuel injector, the air-side of said diesel engine including an intake manifold, an exhaust manifold, and a turbine adapted to drive a compressor for providing compressed air to the intake manifold, the method comprising the steps of:

providing a combined fuel and air-side controller adapted to coordinate both the fuel-side and air-side control of the engine;

sensing one or more fuel-side parameters and one or more air-side parameters; and outputting a fuel profile signal and one or more air-side control signals for controlling at least a part of the fuel-side and at least a part of the air-side of the engine;

wherein the combined fuel and air-side controller includes a multivariable Model Predictive Controller that includes a fuel-side map and an air-side map, the fuel and air-side maps adapted to translate a pedal position signal and/or pedal rate signal into one or more fuel-side set points and one or more air-side parameters for use by the combined fuel and air-side controller.

10. The method of claim 9, wherein the fuel and air-side maps each comprise a dynamic map.

11. The method of claim 9, wherein the fuel and air-side maps each comprise a static map.

12. The method of claim 9, wherein the fuel and air-side maps comprise a single map.

13. The method of claim 9, further comprising at least one air-side set point map adapted to provide one or more air-side set points to the combined fuel and air-side controller.

14. The method of claim 1, wherein the diesel engine further includes an adjustable exhaust gas recirculation (EGR) valve adapted to receive exhaust gas via the exhaust manifold.

15. The method of claim 14, wherein the EGR valve provides a selective amount of exhaust gas to the intake manifold determined by a set position of the EGR valve.

16. A method for controlling a diesel engine system, the diesel engine system including a diesel engine having a fuel-side and an air-side, the fuel-side of said diesel engine including at least one fuel injector, the air-side of said diesel engine including an intake manifold, an exhaust manifold, an adjustable exhaust gas recirculation (EGR) valve adapted to receive exhaust gas via the exhaust manifold and provide a selective amount of exhaust gas to the intake manifold determined by a set position of the EGR valve, and a turbine adapted to drive a compressor for providing compressed air to the intake manifold, the method comprising the steps of:

providing a combined fuel and air-side controller adapted to coordinate both the fuel-side and air-side control of the engine;

sensing one or more fuel-side parameters and one more air-side parameters, the one or more air-side parameters including a sensed $NO_x$ and/or PM emissions parameter;

outputting a fuel profile signal and one or more air-side control signals for controlling at least a part of the fuel-side and at least a part of the air-side of the engine; and setting a current set position for the turbine and/or a current set position of the EGR valve to effect a future value of at least one of the one or more fuel and/or air-side parameters, wherein the current set position(s) is/are dependent on the one or more sensed fuel and/or air-side parameters including the sensed $NO_x$ and or PM emissions parameter.

17. The method of claim 16, wherein the intake manifold has an intake manifold air pressure (MAP), and wherein the current set position for the turbine and the current set position for the EGR valve are dependent on the one or more sensed parameters and the MAP.

18. The method of claim 16, wherein the intake manifold has an intake manifold air flow (MAF), and wherein the current set position for the turbine and the current set position for the EGR valve are dependent on the one or more sensed parameters and the MAF.

19. The method of claim 16, wherein the combined fuel air-side controller is adapted to predict the current set position for the turbine and the current set position for the EGR valve.

20. A method for controlling a diesel engine system, the diesel engine system including a diesel engine having a fuel-side and an air-side, the fuel-side of said diesel engine including at least one fuel injector, the air-side of said diesel engine including an intake manifold, an exhaust manifold, a turbine adapted to drive a compressor for providing compressed air to the intake manifold, and an exhaust gas recirculation valve adapted to receive exhaust gas via the exhaust manifold, the method comprising the steps of:

providing a combined fuel and air-side controller adapted to coordinate both the fuel-side and air-side control of the engine;

sensing one or more fuel-side parameters and one or more air-side parameters, the one or more air-side parameters including a sensed $NO_x$ and/or PM emission parameter;

setting a current set position for the turbine and a current set position of the exhaust gas recirculation valve to effect a future value of at least one of the one or more fuel and/or air-side parameters, the current set positions for the turbine and exhaust gas recirculation valve depending at least in part on one or more sensed fuel and air-side parameters;

predicting a current set point for the turbine and a current set point for the exhaust gas recirculation valve based at least in part on said $NO_X$ and/or PM emission parameter; and outputting a fuel profile signal and one or more air-side control signals for controlling at least a part of the fuel-side and at least a part of the air-side of the engine.

21. An engine system, comprising:

an engine having a fuel side and an air side, the fuel side of said engine including at least one fuel injector, the air side of said engine including an intake manifold, an exhaust manifold, and a turbine adapted to drive a compressor for providing compressed air to the intake manifold;

at least one sensor for sensing one or more fuel-side parameters and one or more air-side parameters of the engine;

a combined fuel and air-side controller adapted to output a fuel profile signal and at least one air-side control signal based at least in part on the fuel-side parameters and air-side parameters received by the at least one sensor; and one or more actuators for controlling at least part of the operation of the engine based on the outputted fuel profile signals and the air-side control signals;

wherein the combined fuel and air-side controller includes a Model Predictive Controller adapted to compute both the fuel and air-side parameters using a central optimization algorithm or routine.

22. An engine system, comprising:

an engine having a fuel side and an air side, the fuel side of said engine including at least one fuel injector, the air side of said engine including an intake manifold, an exhaust manifold, and a turbine adapted to drive a compressor for providing compressed air to the intake manifold;

a combined fuel and air-side controller adapted to output a fuel profile signal and at least one air-side control signal based on feedback signals from one or more actuators and/or sensors, said combined fuel and air-side controller including a Model Predictive Controller.

23. An engine system, comprising:

an engine having a fuel side and an air side, the fuel side of said engine including at least one fuel injector, the air side of said engine including an intake manifold, an exhaust manifold, and a turbine adapted to drive a compressor for providing compressed air to the intake manifold;

a combined fuel and air-side controller adapted to output a fuel profile signal and at least one air-side control signal, said combined fuel and air-side controller including a multivariable Model Predictive Controller adapted to compute both the fuel and air-side parameters using a central optimization algorithm or routine.

24. The engine system of claim 23, further including at least one sensor for sensing one or more fuel-side parameters and/or one or more air-side parameters of the engine.

25. The engine system of claim 24, further including one or more actuators for controlling at least part of the operation of the engine.

26. The engine system of claim 25, wherein the engine system is a closed loop system, and wherein at least one of the actuators provides feedback for the one or more of the fuel-side and/or air-side parameters.

27. The engine system of claim 24, wherein said one or more fuel-side parameters includes a pedal rate signal.

28. The engine system of claim 24, wherein said one or more fuel-side parameters includes a brake position signal.

29. The engine system of claim 24, wherein said one of more fuel-side parameters is selected from the group of signals consisting of a pedal position signal, a MAF signal, an engine speed signal, an AFR low limit signal, a pedal rate signal, and a brake position signal.

30. The engine system of claim 24, wherein said one or more air-side parameters includes a $NO_X$ emission signal.

31. The engine system of claim 24, wherein said one or more air-side parameters includes a particulate matter (PM) emission signal.

32. The engine system of claim 24, wherein said one or more air-side parameters is selected from the group of signals consisting of a MAF signal, a MAP signal, a MAT signal, a $NO_X$ signal, a PM signal, a turbo speed signal, a VNT position signal, and an EGR position signal.

33. The engine system of claim 23, wherein said one or more air-side control signals is selected from the group of signals consisting of a VNT set signal, a VGC set signal, an EGR set signal, an ETURBO set signal, a compressor cooler set signal, and an EGR cooler signal.

34. The engine system of claim 23, wherein said engine is a diesel engine.

* * * * *